April 2, 1963  S. A. ROSENTHAL  3,083,827
EXTRUSION PRESS WITH MULTIPLE-STATION BILLET CONTAINER UNIT
Filed Nov. 2, 1959  2 Sheets-Sheet 1

INVENTOR
Salli Alfred Rosenthal
BY
Hammond
ATTORNEYS

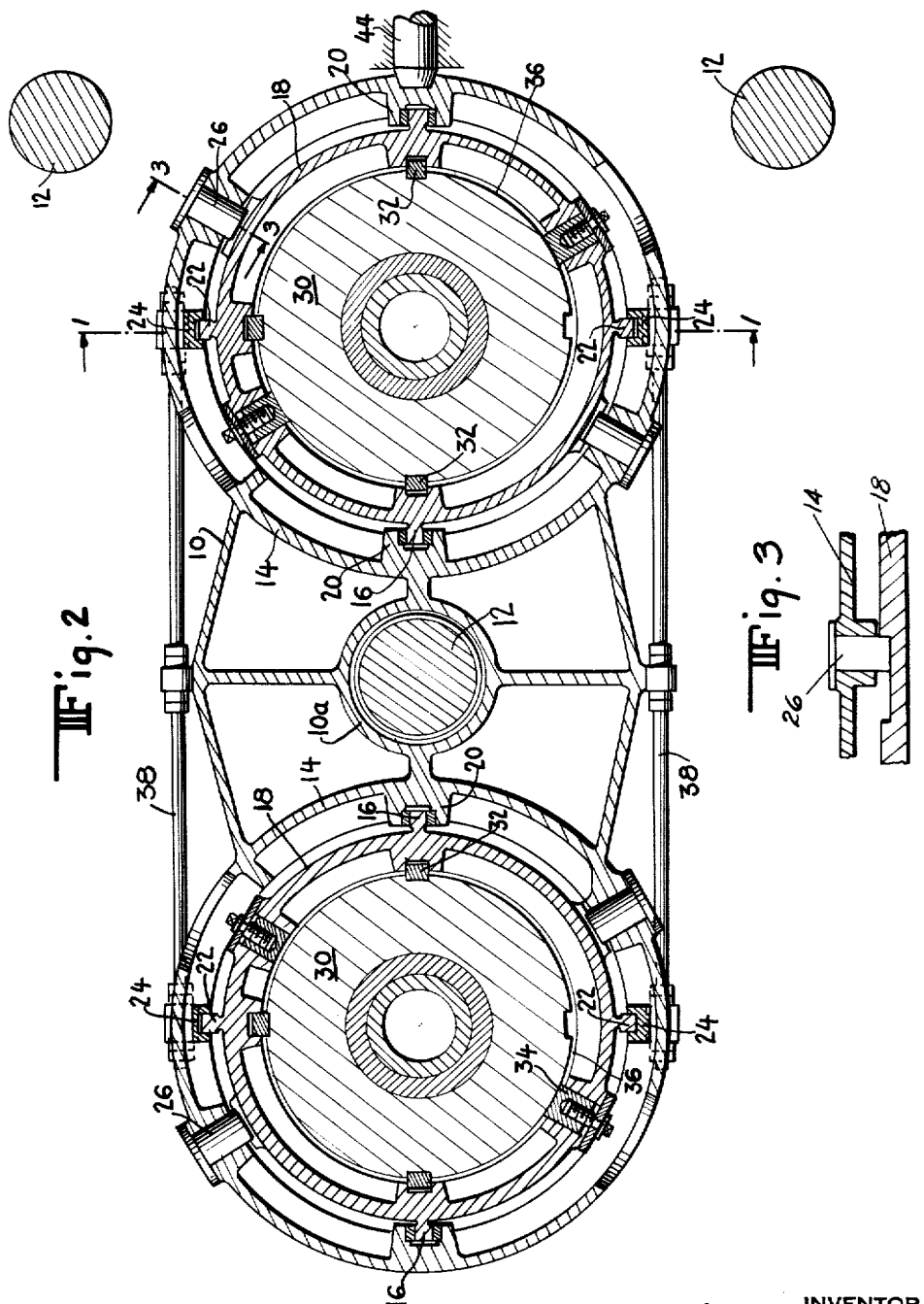

United States Patent Office 3,083,827
Patented Apr. 2, 1963

3,083,827
EXTRUSION PRESS WITH MULTIPLE-STATION BILLET CONTAINER UNIT
Salli Alfred Rosenthal, Poole, Dorset, England, assignor to The Loewy Engineering Company Limited, Bournemouth, England, a corporation of Great Britain
Filed Nov. 2, 1959, Ser. No. 850,254
Claims priority, application Great Britain May 12, 1959
7 Claims. (Cl. 207—15)

This invention relates to metal extrusion presses and, in particular to metal extrusion presses of the type having a multi-station billet container unit.

It is known to provide in a horizontal extrusion press at least two billet containers which are mounted in a common structure. The arrangement is such that one container is in alignment with the extrusion axis of the press, so that a billet can be extruded while the other container is at the same time off-set from its axis in a parking position at the outside of the press where it can be readily entered by a cleaning tool and a billet charging ram. By displacing the common structure, the two containers exchange their stations. Movement of the structure relative to the extrusion axis is either by rotation or by sliding, in the former case, the structure is preferably rotatable about a tie-rod of the press.

During operation of an extrusion press incorporating a multi-station billet container unit, a billet is first loaded in the container, off-set from the extrusion axis of the press, and a pressing disc interposed between the billet and a pressing stem. Next, the container structure is displaced to bring the loaded container to its extrusion sta tion, whereupon the pressing stem is advanced by hydraulic pressure into the container and the billet extruded to the extent in which only a short stump—hereafter called the "discard"—is left between the die and the pressing disc.

It is necessary to sever the extruded article from this discard before the article can be removed from the press. To this end, it has been proposed in presses having a multi-station billet container unit to make use of the conventional method, in which the die, which was mounted on a slide, was withdrawn to the discharge end of the press and beyond, where separation of the discard from the extruded article was effected by a shear or saw. This arrangement had the disadvantage of necessitating to and fro movement of the die through the platen of the press and therebeyond, and required extreme accuracy for cutting in order to avoid fouling the die by the cutting implement.

It has further been proposed in extrusion presses having multi-station billet container units to effect separation between discard and the extruded article merely by the scraping action which occurred between the die mouth and the end-face of the container when the latter was moved from the extrusion into the parking position. This method was very crude and subjected both container and die to considerable wear due to the dragging effect of the material to be cut, apart from the fact that the extruded article was likely to be deformed at or near the cut-off end.

An object of the present invention is to provide in a metal extrusion press having a multi-station billet container unit, improved means to facilitate shearing of the discard after an extrusion operation.

According to the present invention, a metal extrusion press with a multi-station billet container unit comprises a container supporting structure housing at least two billet containers and guide means associated with said structure along which a container may be shifted separately and relative to the structure in a direction coincident with the extrusion axis of the press.

According to a further feature of the invention, a multi-station billet container unit for a metal extrusion press comprises a container supporting structure, housing at least two billet containers and guide means associated with said structure along which a container may be shifted separately independently of and relative to the structure in a direction coincident with the extrusion axis of the press.

With the above arrangement the container can be displaced axially of the press in a direction away from the die without moving at the same time the structure supporting the containers. This enables the severing of the discard from the extruded article to be carried out after removal of the container from the die, with the discard adhering to the container at a point sufficiently spaced apart from the die mouth to avoid any risk of fouling the die.

Preferably hydraulic reciprocating means are provided for shifting a container towards and away from the die front. These means may be common to both containers and be attached to each container in succession.

According to a further feature of the invention, each container is accommodated within a separate container holder, said container holder being arranged to slide longitudinally on guideways arranged on the supporting structure. The guideways of each holder may be adjustable.

The supporting structure may be rotatably mounted about one of the press tie-rods and comprises a separate drum-shaped housing for each container holder and a framework connecting the housings to each other and to a journal on a tie-rod of the press.

The housings may be formed with guideways for the holders which guideways extend axially along the length of the housings and which support the holders in the housings. The guideways may be arranged on inwardly protruding lips of the housing.

Preferably adjustable locating means are associated with the framework which maintain the axes of the containers at a constant distance apart from each other independently of any thermal expansion of the structure, whereby alignment of the container in the extrusion station with the die and extrusion axis, and of the container at the outside station with the cleaning and charging ram is ensured.

One embodiment of a multi-station billet container unit for a horizontal metal extrusion press in accordance with the present invention will now be described in greater detail with reference to the accompanying drawings.

FIGURE 2 is a section along line 2—2 of FIGURE 1A.
FIGURE 3 is a section along line 3—3 of FIGURE 2.

Figure 1A:
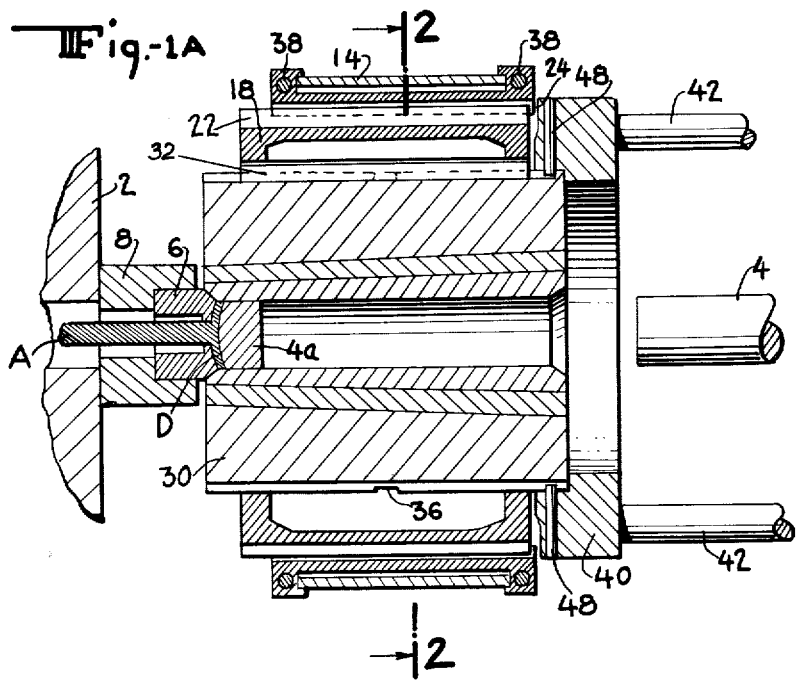
FIGURE 1A is a longitudinal section along line 1—1 of FIGURE 2 through a billet container unit according to the invention, incorporated into an extrusion press and shown with the parts in the positions which they have at the end of an extrusion operation, but before the severing of the discard.

The invention is shown in the drawings as being incorporated into an extrusion press having the usual components such as a platen 2, a pressing stem 4 with a loose disc 4a in front of this pressing stem, a die 6 and a die holder 8 supported against the face of the platen 2. The press has further a billet container unit which will be presently described.

The press is operated in the usual manner in that a billet is first inserted into the container. Thereupon the pressing stem is advanced into the container and the billet extruded through the die so as to form an extruded article A. Extrusion is continued only until a thin discard D is left between the pressing disc and the face of the die, whereupon the discard is separated from the extruded article and the latter removed from the press.

In the embodiment described hereafter the billet container unit has two operating stations; it will be appreciated that the number and disposition of these operating stations may, however, be varied depending on the operating characteristics required of the extrusion press. The unit comprises the billet container supporting structure with a framework 10, having a central hub portion 10a adapted to be rotatably mounted about one of the horizontal press tie-rods 12. At each extremity of the framework 10, there is formed a substantially drum-shaped housing 14 which is provided internally with a pair of horizontal guideways along which are slidably mounted corresponding tongues 16 carried by a container holder 18 of substantially cylindrical configuration. The guideways are arranged on inwardly protruding lips 20 of the housing 14 and may be provided with suitable adjusting means such as cams or screw threaded members, whereby the position of each container holder 18 can be adjusted with respect to the drum axis within narrow limits.

Each container holder 18 has two vertically projecting lugs 22 extending over the whole length thereof. These lugs are held and closely guided in corresponding channel-shaped elements 24 projecting inwardly of the associated housing 14. In addition, each container holder 18 is located in its housing 14 by means of two or more retaining elements in the form of studs 26 carried by said housing 14 and which are inserted in circumferential grooves in the container holder 18. The dimensions of the grooves are such that the container holder 18 can slide longitudinally by a certain amount, as will later be described.

A billet container 30 is located centrally within each container holder 18 by means of keys 32 or the like, which are arranged so that each container can freely expand or contract under the influence of heat changes without altering the central operating position thereof. Radial locking plates 34 project inwardly of each container holder 18 and engage circumferential grooves 36 formed in the corresponding container 30 mounted therein. The locking plates can be withdrawn when changing of a container is required.

The channel-shaped elements 24 guiding the vertical lugs 22 are themselves tied rigidly to the framework 10 at points located on the vertical plane through the fulcrum axis by rods 38 made of a material having a negligible coefficient of thermal expansion. The arrangement is such that any heat expansion in the containers, container holders or container housing will not affect the exact central position of the containers with respect to the press axis or to the axis of the cleaning and charging means. The rod 38 may comprise tubes cooled by means of air or water. These rods are provided with screw threaded adjusting means or the like, whereby the initial setting up of the structure is facilitated.

Hydraulic pressure means are provided for moving the container holder and container which are in axial alignment with the press relative to the associated housing. The pressure means may be constituted by a crosshead 40 adapted to engage the rear face of a container and container holder 18, which crosshead is actuated hydraulically by either a hydraulic cylinder and ram situated centrally at the end of the main press cylinder or by two side cylinders and rams 42 arranged in the main cylinder crosshead.

During operation of the unit, the container 30 charged with the billet to be extruded is swung into position by rotating the frame structure around the press tie-rod 12. Any suitable means, such as an electric or hydraulic motor acting through a reduction gear may be employed to effect this rotation. The container housing 18 when in axial alignment with the press is located by means of a hydraulically operated locking pin 44 or the like. Next pressure is applied to the rearward portion of the container and container holder 18 by the aforesaid pressure means 40 whereby the holder slides forward within the housing 14 to bring the container 30 into sealing engagement with the front of the die 6. Extrusion can now proceed.

Figure 1B:
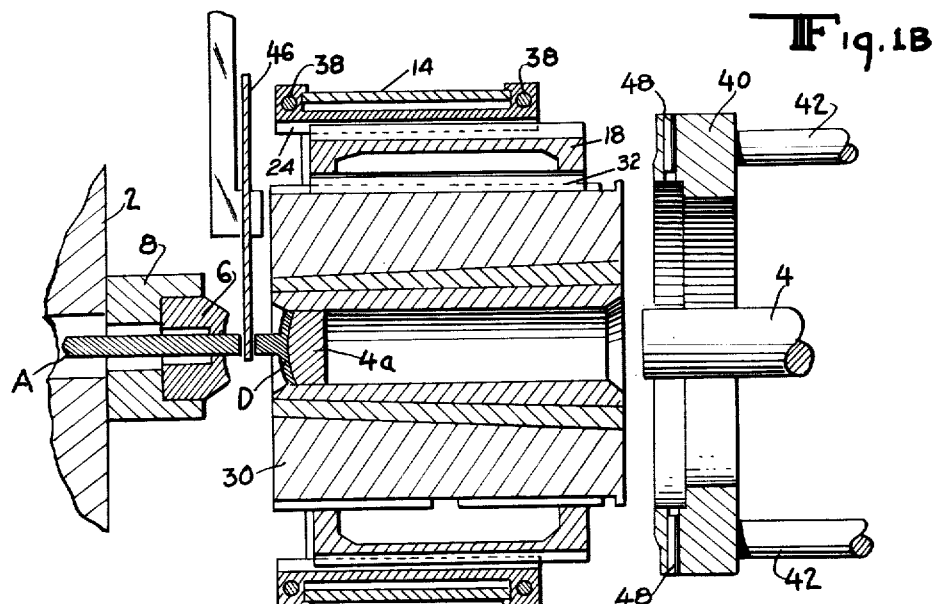
FIGURE 1B is a section corresponding to that of FIGURE 1A with the parts shown in the positions which they have during the severing of the discard.

After an extrusion operation, the container holder 18 and container 30 are axially withdrawn as shown in FIGURE 1B from their operating positions to clear a space in which the extruded material A may be severed by means of a saw 46 from the discard D in front of the die 6. To this end the crosshead 40 of the hydraulic pressure means is coupled to the container 30 and/or container holder 18 by means of coupling pins 48 or the like, so that withdrawal of the pressure means automatically causes the container holder and container to follow. Finally the coupling pins 48 are withdrawn and the crosshead 40 moved further back to clear the structure 10 before the latter is rotated and the two containers exchange their stations.

Thus a fresh billet can be extruded from one container whilst the other container is cleaned and recharged.

It will be noted that the aforedescribed hydraulic pressure means for moving the container 30 and container holder 18 relative to the housing 14 serve also the purpose of sealing the container 30 against the die 6 during an extrusion operation, so that separate sealing means for this purpose are not required.

In an alternative arrangement of the invention, the reciprocating movements of the container holder and container are accomplished by rams on opposite sides thereof. In this case the necessity for locking pins is obviated.

What I claim is:

1. In a metal extrusion press, a multiple station billet container unit comprising a structure for supporting a plurality of billet container assemblies mounted in separate housings at locations spaced apart in said structure, guide means mounted in each housing, said guide means extending in directions parallel to the extrusion axis of the press, a plurality of billet container assemblies arranged one in each said housing, each container assembly being mounted on the associated guide means and being movable axially along the said guide means and being mounted also for transverse adjustment within its housing, said supporting structure being movable relative to the extrusion axis of the press so that each container assembly can be moved successively between a first station in which the axis of the container assembly is aligned with the extrusion axis of the press and a second station in which the container assembly is spaced from the extrusion axis of the press, a die at said first station, and means at said first station for detachable connection with the container assembly at said station for moving said container assembly relative to its housing against and away from said die.

2. In a metal extrusion press, a multiple station billet container unit comprising a structure for supporting a plurality of billet container assemblies mounted in separate housings at locations spaced symmetrically about the longitudinal axis of said supporting structure, guide means mounted in each of said housings, said guide means extending in directions parallel to the extrusion axis of the press, a billet container assembly mounted in each of said housings, each container assembly being mounted on said guide means and being movable axially along the said guide means, said supporting structure being movable relative to the extrusion axis of the press so that each container assembly can be moved successively between a first station in which the axis of the container assembly is aligned with the extrusion axis of the press and a second station in which the container assembly is spaced from the extrusion axis of the press, a die at said first station, and hydraulic shifting means at the first station only to move a container assembly in said first station axially along the associated guide means towards and away from said die, said hydraulic shifting means including a crosshead arranged to engage the container assembly and disengageable coupling means mounted on said crosshead and arranged to couple the crosshead to the container assembly.

3. In a metal extrusion press, a multiple station billet container unit, comprising a framework structure rotatably mounted on the frame of the press, said structure including a plurality of housings for the reception of billet container assemblies, guide means mounted in each of said housings, said guide means extending in directions parallel to the extrusion axis of the press, a plurality of billet container assemblies arranged one in each of said housings, each container assembly being mounted on the associated guide means and being movable axially along the said guide means, said framework structure being rotatable relative to the frame of the press, so that each container assembly can be moved successively between a first station in which the axis of the container assembly is aligned with the extrusion axis and a second station in which the container assembly is spaced from the extrusion axis, mean operative to lock the structure in each position in which a container assembly is in said first station, a die at said first station, and means at said first station for detachable connection with the container assembly at said station for moving said container assembly relative to its housing against and away from said die.

4. In a metal extrusion press, a die, a multiple station billet container unit comprising a framework structure for supporting a plurality of billet container assemblies mounted in separate housings at locations spaced symmetrically about the center of said framework structure, guide means mounted in each housing, a plurality of billet container assemblies arranged one in each of said housings, each container assembly being adjustably mounted on the associated guide means and being capable of a limited degree of transverse movement in said guide means toward and away from the center of said framework structure and adjustable locating means coupling each container assembly to the framework structure at points adjacent the plane through the center of the structure and normal to the plane through the axis of the container assembly and the center of the structure, said adjustable locating means having only negligible expansion when subject to heat whereby the said locating means maintains the axis of the container assembly at a substantially constant spacing from the center of said framework structure independently of any thermal expansion of the structure, the structure being movable relative to the extrusion axis of the press so that each container assembly can be moved successively between a first station in which the axis of the container assembly is aligned with the extrusion axis and a second station in which the container assembly is spaced from the extrusion axis said adjustable locating means permitting transverse adjustment of each container assembly within its housing toward and away from the center of said framework structure.

5. A multiple station billet container unit according to claim 4 wherein said locating means includes screw-threaded means adjustable to regulate the distance between each container and the center of the structure.

6. In a metal extrusion press, a multiple station billet container unit comprising a framework structure rotatably mounted on the frame of the press and including two billet container assembly housings symmetrically disposed on opposite sides of the plane of symmetry through the rotational axis of said framework, a first pair of guide means mounted on inwardly projecting lips on diametrically opposite sides of each of said housings, said first pair of guide means lying in a plane framework structure, a second pair of guide means on diametrically opposite sides of said housings projecting into each of said housings and lying in a plane at right angles to the plane of said first pair of guide means, locating means coupling said second pair of guide means to the structure at points adjacent said plane of symmetry, said first and second pairs of guide means extending in directions parallel to the rotational axis of the structure, two billet container assemblies arranged one in each of said housings and mounted on said first and second pairs of guide means, each container assembly being movable axially along the first and second pairs of guide means and being movable transversely within said first pair of guide means, the said locating means having only a negligible expansion when subjected to heat whereby the locating means maintain the axes of the container assemblies at a substantially constant distance from the rotational axis of said framework structure independently of any thermal expansion of the structure, and the structure being rotatable so that each container assembly can be moved successively between a first station in which the axis of the container assembly is aligned with the extrusion axis of the press and a second station in which the container assembly is spaced from the said extrusion axis, and means at said first station for detachable contact with a container assembly to move a container assembly in said first station axially along the said first and second pairs of guide means towards and away from the extrusion die of the press, while the other container assembly remains stationary.

7. A multiple station billet container unit according to claim 6 wherein said locating means includes a plurality of adjustable rods of substantially negligible expansion connected to said second pair of guide means substantially tangentially to said billet container assembly housings.

References Cited in the file of this patent

UNITED STATES PATENTS

| | | |
|---|---|---|
| 887,718 | Benjamin | May 12, 1908 |
| 1,286,726 | Noble | Dec. 3, 1918 |
| 2,039,947 | Albers | May 5, 1936 |
| 2,720,970 | Roux | Oct. 18, 1955 |

FOREIGN PATENTS

| | | |
|---|---|---|
| 542,045 | Germany | Jan. 19, 1932 |
| 1,163,770 | France | Apr. 28, 1958 |

OTHER REFERENCES

Metals Handbook, 1939 edition, published by the American Society for Metals, page 1619.

UNITED STATES PATENT OFFICE
CERTIFICATE OF CORRECTION

Patent No. 3,083,827 April 2, 1963

Salli Alfred Rosenthal

It is hereby certified that error appears in the above numbered patent requiring correction and that the said Letters Patent should read as corrected below.

Column 2, line 6, strike out "separately"; column 6, line 11, after "plane" insert -- passing through the rotational axis of said --.

Signed and sealed this 7th day of April 1964.

(SEAL)
Attest:

ERNEST W. SWIDER
Attesting Officer

EDWARD J. BRENNER

Commissioner of Patents